United States Patent [19] [11] 3,910,036
Irwin [45] Oct. 7, 1975

[54] IGNITER INSTALLATION FOR COMBUSTOR WITH CERAMIC LINER

[75] Inventor: John A. Irwin, Indianapolis, Ind.

[73] Assignee: General Motors Corporation, Detroit, Mich.

[22] Filed: Apr. 5, 1974

[21] Appl. No.: 458,075

[52] U.S. Cl. ........... 60/39.32; 60/39.65; 60/39.82 R; 285/187
[51] Int. Cl.² ... F02C 7/20; F02C 7/26; F16L 55/00
[58] Field of Search...... 60/39.82 S, 39.82 R, 39.32, 60/39.65, 39.31; 431/263; 285/192, 187

[56] References Cited
UNITED STATES PATENTS

| | | |
|---|---|---|
| 2,674,846 | 4/1954 | Bloomer et al. ............... 60/39.65 X |
| 2,919,549 | 1/1960 | Haworth et al. .................... 60/39.65 |
| 3,007,312 | 11/1961 | Shutts ............................. 60/39.82 R |

Primary Examiner—William L. Freeh
Assistant Examiner—Thomas I. Ross
Attorney, Agent, or Firm—Paul Fitzpatrick

[57] ABSTRACT

A combustor for a gas turbine engine embodies a ceramic liner the upstream or dome end of which has a hole for an igniter. The igniter is supported from the combustion chamber housing by an annular spring-biased structure which engages the outer surface of the dome around the hole and retains a gasket to control entrance of air through the hole.

6 Claims, 2 Drawing Figures

IGNITER INSTALLATION FOR COMBUSTOR WITH CERAMIC LINER

This invention is directed to combustion apparatus such as is used in a gas turbine engine, and particularly to combustion liner structure for such apparatus.

By way of background, most gas turbine combustion apparatuses include a liner within which combustion takes place. Such liners ordinarily are of circular or annular cross-section, with an upstream end called a dome and an outlet at the downstream end for combustion products. Fuel is sprayed at the upstream end and air enters through the upstream end and through the side wall of the liner to effect combustion and to dilute the combustion products to a suitable temperature. An igniter is provided to initiate combustion.

Although walls of many combustion apparatuses have been made of various ceramic materials, practical gas turbine combustion liners, so far I am aware, have been made of high temperature resisting metal alloys. Such metal alloy structures have good hot strength and a relatively high degree of durability. However, such combustion liners are very expensive; therefore, if ceramics can be substituted for the metal to provide a satisfactory liner, considerable savings may result.

While various known ceramics are highly resistant to heat and may be formed into cylinders and other shapes by known techniques, such materials are relatively weak and brittle. Also, the ceramics have relatively low thermal expansion, which presents a problem when it becomes necessary to mount them with metal components in an engine combustion apparatus.

This invention is directed to a structure which facilitates the employment of ceramic elements for the major portion of a combustion liner so as to retain the cost and temperature resisting advantages of the ceramic while avoiding stresses on the ceramic material which would be likely to cause cracking or breaking.

This invention relates particularly to an arrangement for associating the fuel igniter with a ceramic combustion liner so as to provide a leak-free entry of the igniter into the combustion liner and avoid undesirable stress on the liner.

The principal objects of my invention are to provide improved and more economical combustion apparatus for gas turbine engines and to provide improved means for mounting an igniter in a ceramic combustion liner in a combustion apparatus.

The nature of the invention and its advantages will be more clearly apparent to those skilled in the art from the succeeding detailed description of preferred embodiments of the invention and the accompanying drawings thereof.

Figure 1:
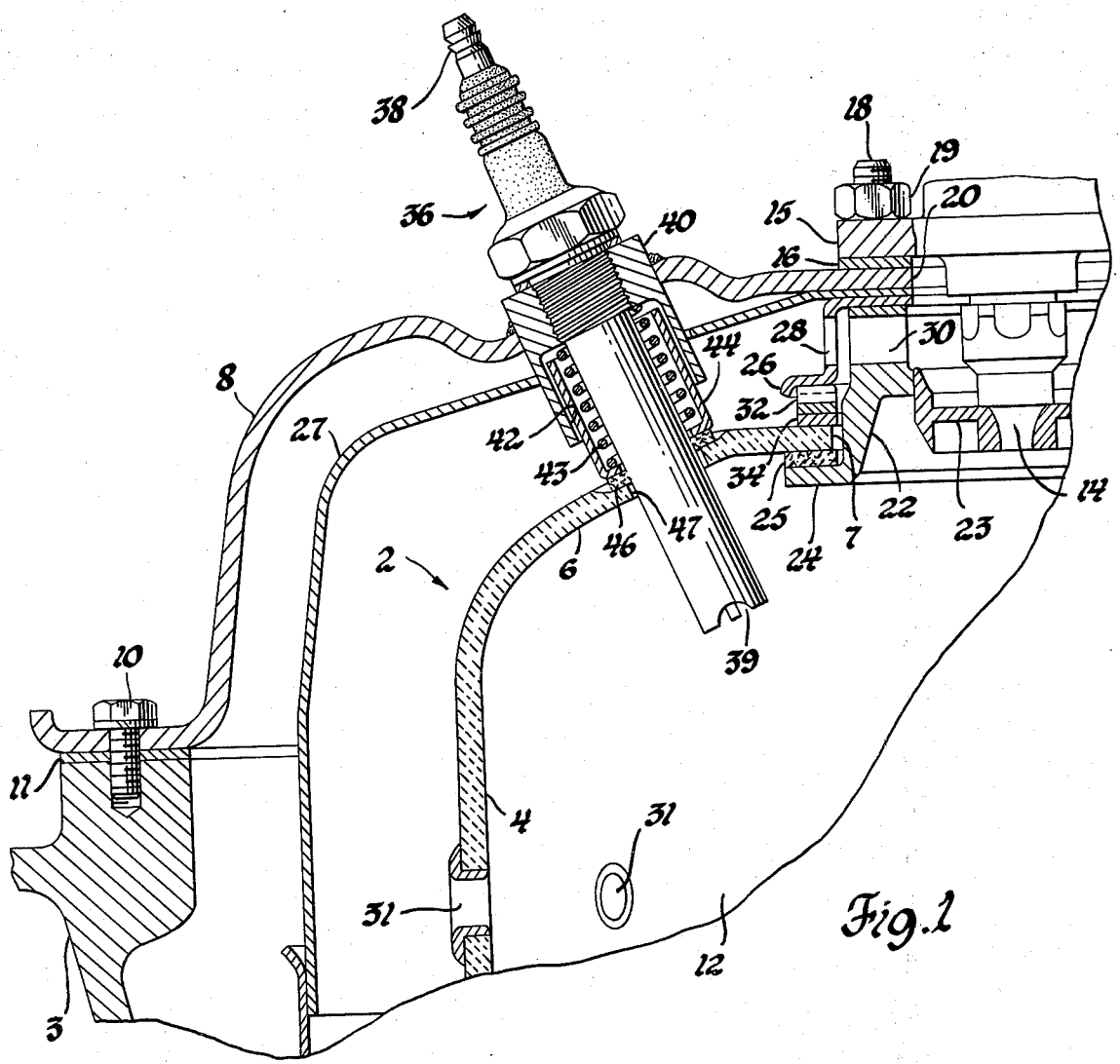
FIG. 1 is a partial sectional view illustrating the upstream end of a combustion apparatus, the view being taken on a plane containing the axis of the combustion liner.

The figures illustrate a combustion liner as installed in a gas turbine engine of known type which may be similar to those described in U.S. Pat. Nos. as follows: Collman et al 3,077,074, Feb. 12, 1963; Collman et al 3,267,674, Aug. 23, 1966; and Bell 3,490,746, Jan. 20, 1970. The combustion liner 2 may be mounted in a suitable space within the engine, a portion of the frame or housing of the engine being designated as 3. The combustion liner illustrated is an integral ceramic structure of circular cross section including a generally cylindrical side wall 4 and a converging upstream end or dome portion 6. A circular opening 7 is located centrally in the dome portion. The downstream end of the liner (not illustrated) may discharge through suitable structure into a turbine, as is generally understood.

The liner is supported from a combustion chamber cover 8 forming part of the housing of the engine and of the combustion apparatus. The combustion chamber cover may be secured around its periphery by cap screws 10 and be sealed by a gasket 11. Fuel is sprayed into the combustion zone of the liner, indicated generally at 12, by a fuel spray nozzle 14 which includes a mounting flange 15 held against a gasket 16 by studs 18 extending through the cover 8 and bearing nuts 19. The fuel nozzle extends through an opening 20 in the cover which is closed by the flange 15. Studs 18, which may be three in number, extend from an annular abutment 22 which surrounds the fuel nozzle 14. An air swirler 23, which may be part of the fuel nozzle casting, is disposed between the fuel nozzle spray tip and the abutment 22.

The abutment 22 includes a flange 24 which engages the inner surface of the dome 6 around the opening 7. A slightly yieldable or resilient gasket 25 of high temperature resistant material such as a ceramic felt is disposed between the flange 24 and the ceramic liner. An annular spring reaction member 26 and an air baffle 27 are disposed between the abutment 22 and the inner side of the cover 8. The air baffle 27 serves to shield the cover 8 from heat radiating from hot parts of the engine and also serves somewhat to guide combustion air towards the liner. Such combustion air can flow in part through sets of holes 28 in the reaction member and 30 in the abutment to reach the air swirler 23. Additional combustion air is delivered into the combustion zone through ports 31 distributed around the liner. Additional air for dilution of the combustion products may enter farther downstream of the liner, as is well known and is not illustrated in FIG. 1.

The liner 2 is biased against the flange 24 by a circular wave spring 32 which bears against the outer surface of the liner through a rigid washer 34. This washer serves to prevent application of undue localized force on the liner at the high points of the convolutions of wave spring 32. As will be apparent, the spring provides secure location of the liner and couples it with sufficient rigidity to the support or abutment 22 while avoiding undue pressure or destructive crushing force on the liner because of the resilient nature of the structure. Also, the resilient structure is tolerant of relative expansion of the metal and ceramic parts. Ordinarily, the abutment 22 will be hotter than and will expand more than the reaction member 26. Wave spring 32 accommodates this relative expansion axially of the liner. Also, the clearance between the opening 7 and the side wall of the abutment is sufficient to allow for relative radial expansion of the metal and ceramic parts without providing too much latitude in the location of the liner.

The igniter 36 is a rod-like body which includes a terminal or electrical input end 38 and a sparking electrode arrangement 39. The details of the igniter are immaterial to the invention. Such igniters are well known. The igniter is threaded into a cup-shaped socket or hollow boss 40 extending through an opening in the cover 8 and welded in place. A cylindrical cavity 42 in the socket 40 receives a coil compression spring 43. This spring bears against a generally cylindrical plunger 44 which is slidable within the socket 40. The plunger has an inturned flange against which the spring 43 bears and which bears in turn against a washer or gasket 46. The gasket bears against a flat exterior surface portion of the dome which surrounds a port 47 in the dome through which the igniter extends. The gasket is made of a suitable somewhat yielding heat resistant material such as a ceramic felt, for example. It prevents undesired air flow through the port 47 which could create thermal stresses by cooling the dome wall around port 47. The spring 43 can yield to accommodate expansion of the liner and prevent undue loading of the liner while restricting flow through the port 47.

Figure 2:
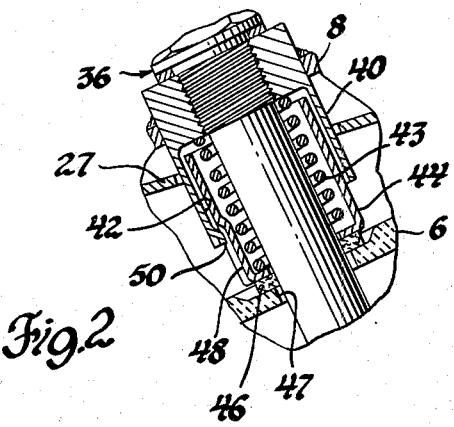
FIG. 2 is a detailed view illustrating a modified arrangement for mounting the igniter of the combustion apparatus.

FIG. 2 illustrates a slight modification of the structure. It includes means to retain the plunger 44 in the socket 40. In this form, the plunger 44 has a groove 48 impressed in it. After the plunger is installed, the margin of the socket is deformed as indicated at 50 to prevent ejection of the plunger from its socket.

It will be apparent to those skilled in the art from the foregoing description that the structures described provide for adequate support and sealing of the igniter against the ceramic liner which is not so rigid as to cause danger of cracking or chipping of the liner.

The detailed description of the preferred embodiment of the invention for the purpose of explaining the principles thereof is not to be considered as limiting or restricting the invention, since many modifications may be made by the exercise of skill in the art.

I claim:

1. A combustion apparatus for a gas turbine engine comprising, in combination, a housing, a combustion liner having a wall of ceramic material fixedly mounted within the housing, means for supplying fuel to the liner for combustion, and igniter means for igniting the fuel extending from outside the housing into the interior of the liner, the liner wall having a hole for admission of the igniter means, in which the improvement comprises an annular member surrounding the igniter means outside the liner, a gasket disposed between and engaging the member and the ceramic liner wall outer surface around the igniter admission hole to control entrance of air into the liner around the igniter means through the hole, and resilient means reacting against the housing biasing the member against the gasket.

2. An apparatus as recited in claim 1 including means by which the annular member is guided reciprocably on the housing.

3. An apparatus as recited in claim 1 in which the gasket is of a yielding heat resistant material.

4. A combustion apparatus for a gas turbine engine comprising, in combination, a housing, a combustion liner having a wall of ceramic material fixedly mounted within the housing, means for supplying fuel to the liner for combustion, and igniter means for igniting the fuel extending from outside the housing into the interior of the liner, the liner wall having a hole for admission of the igniter means, in which the improvement comprises an annular boss extending from the housing, an annular plunger slidably supported by the boss and surrounding the igniter means outside the liner, a gasket disposed between and engaging the plunger and the ceramic liner wall outer surface around the igniter admission hole to control entrance of air into the liner around the igniter means through the hole, and a spring reacting against the boss and plunger biasing the plunger against the gasket.

5. An apparatus as recited in claim 4 in which the gasket is of a yielding heat resistant material.

6. An apparatus as recited in claim 4 including also means on the boss and plunger cooperating to retain the plunger and boss in assembled relation by limiting the sliding movement of the plunger.

* * * * *